(12) United States Patent
Jackson et al.

(10) Patent No.: US 9,781,272 B2
(45) Date of Patent: *Oct. 3, 2017

(54) SYSTEM AND METHODS FOR ENHANCED MULTIMEDIA IN VOIP NETWORKS

(71) Applicant: AT&T Intellectual Property I, L.P., Atlanta, GA (US)

(72) Inventors: James Jackson, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,403

(22) Filed: Oct. 27, 2016

(65) Prior Publication Data

US 2017/0048391 A1  Feb. 16, 2017

Related U.S. Application Data

(63) Continuation of application No. 15/054,775, filed on Feb. 26, 2016, now Pat. No. 9,509,849, which is a continuation of application No. 13/548,806, filed on Jul. 13, 2012, now Pat. No. 9,300,804, which is a continuation of application No. 12/489,567, filed on Jun. 23, 2009, now Pat. No. 8,254,545.

(51) Int. Cl.
| | |
|---|---|
| *H04M 3/42* | (2006.01) |
| *H04M 3/53* | (2006.01) |
| *H04M 3/533* | (2006.01) |
| *H04M 7/00* | (2006.01) |
| *H04L 29/12* | (2006.01) |

(52) U.S. Cl.
CPC ........ *H04M 3/5307* (2013.01); *H04L 61/157* (2013.01); *H04M 3/5315* (2013.01); *H04M 3/53366* (2013.01); *H04M 7/006* (2013.01); *H04M 3/42382* (2013.01); *H04M 2203/158* (2013.01); *H04M 2203/4509* (2013.01); *H04M 2203/4518* (2013.01); *H04M 2203/4536* (2013.01)

(58) Field of Classification Search
CPC ........................ H04M 3/5315; H04M 3/53366
USPC ................ 379/88.12, 88.13, 214.01, 220.01, 379/211.02–212.01
See application file for complete search history.

(56) References Cited

U.S. PATENT DOCUMENTS

| | | |
|---|---|---|
| 6,018,524 A | 1/2000 | Turner et al. |
| 6,392,997 B1 | 5/2002 | Chen et al. |
| 6,594,655 B2 | 7/2003 | Tal et al. |
| 6,978,309 B1 | 12/2005 | Dorbolo et al. |
| 7,248,857 B1 | 7/2007 | Richardson et al. |
| 7,257,201 B2 | 8/2007 | Singh et al. |
| 7,457,251 B1 | 11/2008 | Chen et al. |
| 7,647,426 B2 | 1/2010 | Patel |
| 7,948,967 B2 | 5/2011 | Ku |

(Continued)

*Primary Examiner* — William Deane, Jr.
(74) *Attorney, Agent, or Firm* — Chiesa Shahinian & Giantomasi PC

(57) ABSTRACT

Calls placed to a call recipient bypass the terminating messaging system, creating an enhanced message in the call originator's messaging system and delivering the enhanced message using alternate routing information. A caller creates enhanced messages for a call recipient even when the call recipient's messaging system does not support such functionality. The caller also embeds stored content and/or use links in the enhanced messages to allow the message to be modified and/or deleted before it is accessed by the call recipient.

20 Claims, 3 Drawing Sheets

(56) References Cited

U.S. PATENT DOCUMENTS

| | | |
|---|---|---|
| 7,949,706 B2 | 5/2011 | Malik |
| 8,184,540 B1 | 5/2012 | Perla et al. |
| 8,194,829 B1 | 6/2012 | Das et al. |
| 8,325,897 B1 | 12/2012 | McClintock et al. |
| 8,548,129 B2 | 10/2013 | Richardson et al. |
| 8,582,731 B2 | 11/2013 | Al-Khaja et al. |
| 2006/0002406 A1 | 1/2006 | Ishihara et al. |
| 2006/0078105 A1 | 4/2006 | Korn et al. |
| 2006/0245578 A1 | 11/2006 | Bienfait |
| 2007/0121879 A1 | 5/2007 | McGary et al. |
| 2008/0049912 A1 | 2/2008 | Carter et al. |
| 2008/0084880 A1 | 4/2008 | Dharwadkar et al. |
| 2008/0084881 A1 | 4/2008 | Dharwadkar et al. |
| 2008/0232557 A1 | 9/2008 | Baird et al. |
| 2010/0049702 A1 | 2/2010 | Martinez et al. |
| 2010/0135304 A1 | 6/2010 | Mulligan et al. |
| 2010/0157977 A1 | 6/2010 | Ku |
| 2010/0158201 A1 | 6/2010 | Vijay Marathe et al. |
| 2010/0215163 A1 | 8/2010 | Kashen et al. |
| 2010/0246783 A1 | 9/2010 | Rose et al. |
| 2010/0272247 A1 | 10/2010 | Arsenault et al. |
| 2010/0278319 A1 | 11/2010 | Wang et al. |
| 2011/0202598 A1 | 8/2011 | Evans et al. |
| 2012/0093154 A1 | 4/2012 | Rosenberg et al. |
| 2012/0281819 A1 | 11/2012 | Madhavapeddi et al. |
| 2013/0029671 A1 | 1/2013 | Islam et al. |

SYSTEM AND METHODS FOR ENHANCED MULTIMEDIA IN VOIP NETWORKS

CROSS-REFERENCE TO RELATED APPLICATIONS

This application is a continuation of U.S. patent application Ser. No. 15/054,775, filed Feb. 26, 2016, which is a continuation of U.S. patent application Ser. No. 13/548,806, filed Jul. 13, 2012, now U.S. Pat. No. 9,300,804, which is a continuation of U.S. patent application Ser. No. 12/489,567, filed Jun. 23, 2009, now U.S. Pat. No. 8,254,545, the disclosures of which are incorporated by reference herein in their entirety.

FIELD OF THE DISCLOSURE

The present invention relates generally to message handling and more particularly to message handling in a unified messaging platform environment.

Traditional messaging systems that rely on call forwarding (e.g., voicemail, etc.) must create messages at the terminating (e.g., destination) message system. It is not possible for the originating caller to influence message handling at the terminating message system. For example, it is not possible for a caller to request that a call should not be forwarded to a voicemail system. Thus, the originating caller is at the mercy of the functionality provided by the terminating message system.

Accordingly, improved systems and methods for message handling in a unified messaging platform environment are required.

BACKGROUND OF THE DISCLOSURE

The present invention relates generally to message handling and more particularly to message handling in a unified messaging platform environment.

These and other advantages of the invention will be apparent to those of ordinary skill in the art by reference to the following detailed description and the accompanying drawings.

DETAILED DESCRIPTION OF THE DRAWINGS

In at least one embodiment of the present invention calls placed to a call recipient bypass the terminating messaging system, creating an enhanced message in the call originator's messaging system and delivering the enhanced message using alternate routing information. This allows a caller to create enhanced messages for a call recipient even when the call recipient's messaging system does not support such functionality. The caller may also embed stored content and/or use links in the enhanced messages to allow the message to be modified and/or deleted before it is accessed by the call recipient.

Figure 1:
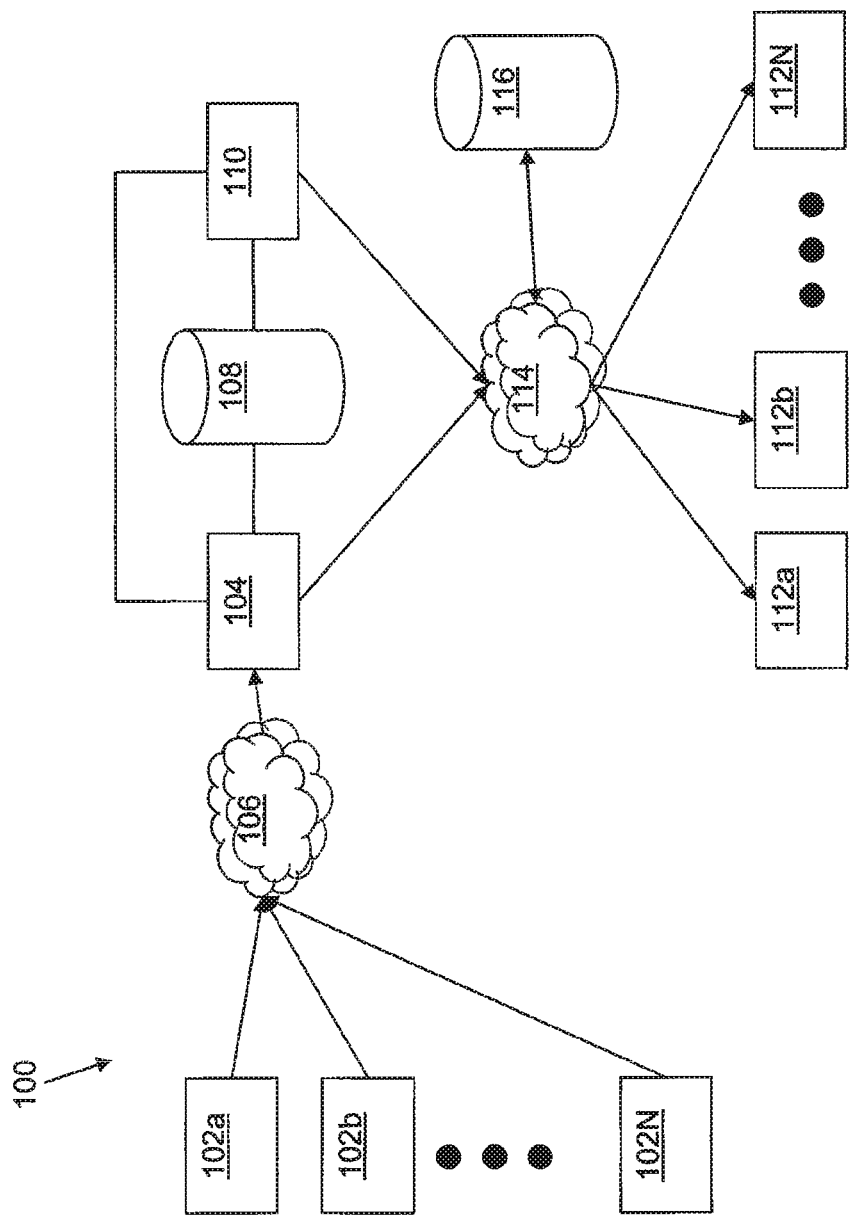
FIG. 1 depicts a messaging system according to an embodiment of the present invention.

FIG. 1 depicts a messaging system 100 according to an embodiment of the present invention. Messaging system 100 includes one or more calling parties 102a, 102b, . . . , 102N in communication with a caller application server 104 through a network 106. Caller application server 104, in turn, has access to and/or is in communication with one or more routing databases 108, which has access to and/or is in communication with Unified Messaging (UM) platform 110. Caller application server 104 and UM platform 110 are also in communication with one or more called parties 112a, 112b, . . . , 112N through network 114. Called parties 112a-N are also in communication with messaging server 116 through network 114.

As described herein, "in communication with" describes connection between components (e.g., calling parties 102a-N, caller application server 104, routing database 108, UM platform 110, called parties 112a-N, messaging server 116, etc.) that can transmit signals and/or information to each other using any appropriate protocol and combination of wired and/or wireless communication techniques (e.g., VOIP, wired, IP, etc.).

Calling parties 102a-N are users of call origination equipment such as wired telephones, wireless telephones, and the like. Similarly, called parties 112a-N are users of call reception equipment such as wired telephones, wireless telephones, and the like. Herein, the terms calling parties 102a-N and called parties 112a-N are used to describe both the human users of the call origination/reception equipment and the physical equipment that is enabled to perform the functions described below. Though described separately as call originators and call receptors or terminators, it is understood that calling parties 102a-N could be receivers of calls and called parties 112a-N could be originators of calls, as in a conventional telephony network.

Application server 104 is any appropriate server or combination of servers particularly configured to host an application programming interface (API) that performs the functions described below.

Networks 106 and 114 are any appropriate calling network, such as a circuit switched network (e.g., PSTN) or packet switched network (e.g., Internet). Network 106 is associated at least with calling parties 102a-N, which originate calls, and may thus be referred to as an origination network. Similarly, network 114 is associated with called parties 112a-N and may thus be referred to as a terminating network.

For diagrammatical simplicity, networks 106 and 114 have been shown as separate entities. It is understood that networks 106 and 114 may, in some embodiments, be the same network. Similarly, network 106 and/or network 114 may include one or more of calling parties 102a-N, caller application server 104, routing database 108, UM platform 110, called parties 112a-N, and/or messaging server 116. Thus, the various components of messaging system 100 may, in some embodiments, be used interchangeably and/or substitutionally to perform the method steps described below with respect to FIG. 3.

Routing database 108 may be any appropriate database storing routing information. Routing information includes telephone number mapping (ENUM) routing information, domain name system (DNS) routing information, name authority pointer (NAPTR) records, uniform resource identifiers (URIs), and the like.

UM platform 110 is any appropriate unified messaging system that integrates different streams of communications (e.g., email, SMS, facsimile, voice, video, etc.) into a single interface, accessible from a variety of different devices. UM platform 110 receives, stores, and/or forwards such streams to calling parties 102a-N and/or called parties 112a-N regardless of network.

Messaging server 116 is a server or similar platform capable of receiving, storing, and/or forwarding messages. In at least one embodiment, messaging server 116 is a UM platform. In the same or alternative embodiments, messaging server 116 is associated with network 114 and is a message recipient server for called parties 112a-N. That is, messaging server 116 is a voicemail server for called parties on a particular network or service provider.

Figure 2:
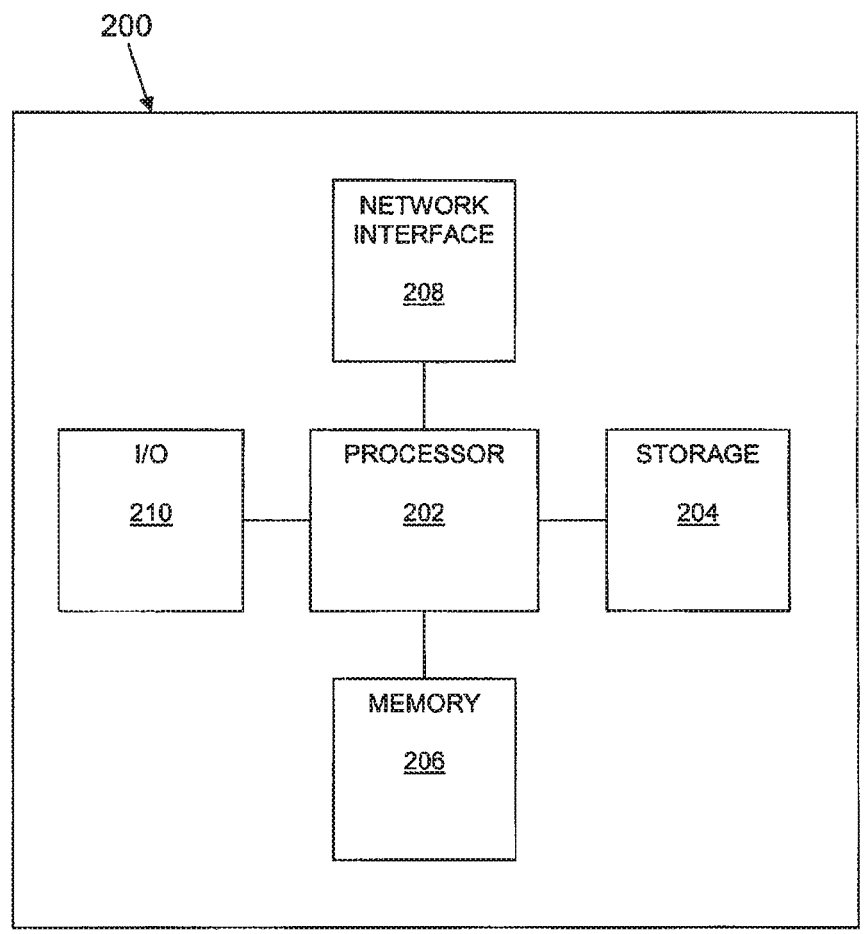
FIG. 2 is a schematic drawing of a controller.

FIG. 2 is a schematic drawing of a controller 200 according to an embodiment of the present invention. Controller 200 and/or its constituent components may be used as or in conjunction with one or more of caller application server 104, routing database 108, UM platform 110, and/or messaging server 116.

Controller 200 contains devices that form a controller including a processor 202 that controls the overall operation of the controller 200 by executing computer program instructions, which define such operation. The computer program instructions may be stored in a storage device 204 (e.g., magnetic disk, database, etc.) and loaded into memory 206 when execution of the computer program instructions is desired. Thus, applications for performing the herein-described method steps, such as those described below with respect to method 300 are defined by the computer program instructions stored in the memory 206 and/or storage 204 and controlled by the processor 202 executing the computer program instructions. The controller 200 may also include one or more network interfaces 208 for communicating with other devices via a network (e.g., messaging system 100). The controller 200 also includes input/output devices 210 that enable operator interaction with the controller 200. Controller 200 and/or processor 202 may include one or more central processing units, read only memory (ROM) devices and/or random access memory (RAM) devices. One skilled in the art will recognize that an implementation of an actual computer for use in a portable communication device could contain other components as well, and that the controller of FIG. 2 is a high level representation of some of the components of such a portable communication device for illustrative purposes.

According to some embodiments of the present invention, instructions of a program (e.g., controller software) may be read into memory 206, such as from a ROM device to a RAM device or from a LAN adapter to a RAM device. Execution of sequences of the instructions in the program may cause the controller 200 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 206 may store the software for the controller 200, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

Figure 3:
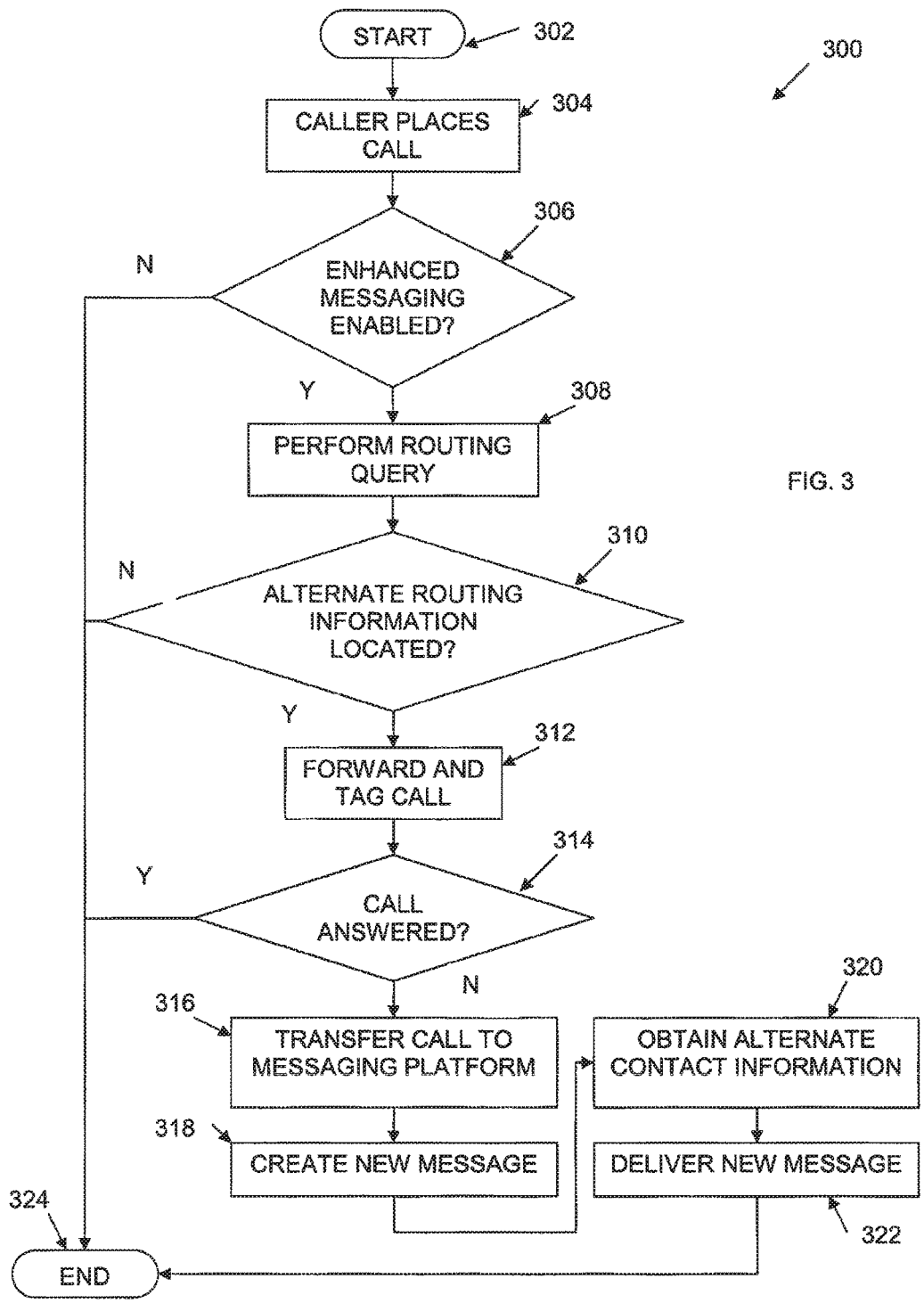
FIG. 3 depicts a flowchart of a method of call forwarding according to an embodiment of the present invention.

FIG. 3 is a flowchart of a method 300 of call forwarding according to an embodiment of the present invention. The method 300 may be performed by components of messaging system 100 as will be described below. The method 300 starts at step 302.

In step 304, a caller (e.g., calling party 102a) places a call to a called party (e.g., called party 112a). Such a call may be placed over one or more networks 106 and/or 114.

In step 306, a determination is made as to whether the caller has enabled an enhanced messaging feature. If the enhanced messaging feature is enabled (e.g., at the application server 104), the method proceeds to step 308. If not, the method ends at step 324. The enhanced messaging feature is enabled for the subscriber via a separate provisioning mechanism. For example, the provisioning mechanism may take the form of a web portal that allows the subscriber to control their settings.

In step 308, application server 104 performs a routing query. In at least one embodiment, application server 104 performs an ENUM query (e.g., via routing database 108) to determine one or more alternate contacts (e.g., email address, etc.). That is, application server 104 leverages the original routing information (e.g., a telephone number) about the called party 112a to determine if additional routing information is stored at routing database 108 and/or another location. In at least one embodiment, the application server 104 performs the query to locate an acceptable URI for the called party 112a.

In step 310, a determination is made as with whether viable alternate routing information has been found. If acceptable alternate routing information is found, the method passes control to step 312. If no acceptable alternate routing information is found, the method ends at step 324.

If acceptable alternate routing information is found, the call is forwarded to called party 112a via network 114 and is tagged with an indication that the call should not be forwarded to the voicemail application and server of called party 112a should the call not be answered. In at least one embodiment, the call is tagged in the session initiation protocol (SIP). The "msg-taker" service is indicated as an unacceptable contact with Internet Engineering Task Force (IETF) request for comments (RFC) 3841 "Caller Preferences for SIP," for example. Generally, the indication that the call should not be forwarded may be specified by indicating that the call must not fork (e.g., by utilizing the "no-fork" directive of IETF RFD 3841).

In step 314, a determination is made as to whether the call has been answered by the called party 112a. If the call has been answered, the method ends at step 324. Otherwise, the method proceeds to step 316 and the application server 104 transfers the call to a local messaging platform. In at least one embodiment, the call is transferred to a unified messaging platform 110 that is associated with network 114. In an alternative embodiment, the call is transferred to another local messaging server, such as messaging server 116. As the call is transferred to the messaging platform, an indication is provided that the enhanced messaging feature has been enabled, as in step 306, along with an indication of the originally dialed telephone number (e.g., the telephone number of called party 112a). In at least one embodiment, the indication is provided via a custom header or header parameter in a session initiation protocol (SIP). The call may be moved to the local messaging system via "Call Forwarding" on the Application Server/Feature Server. In at least one embodiment, this may occur for several reasons including "ring no answer", "busy", etc.

In the local messaging platform (e.g., UM platform 110, etc.), the call is connected from the calling party 102a to the called party 112a and a new message is created in step 318. That is, calling party 102a creates a message with content that has been previously stored or may provide links to such content. The calling party 102a creates the content by recording a message (e.g., at messaging server 116, etc.) and optionally associating additional stored information with the message. The calling party 102a may also interact with the messaging platform via dual-tone multi-frequency (DTMF) or via voice commands.

In step 320, the local messaging platform determines alternate contact information for the called party 112a. In at least one embodiment, UM platform 110 performs an ENUM query (e.g., at routing database 108) to determine any existing contact preference (e.g., email, MMS, etc.) established by the calling party 102a and/or the called party 112a. In some embodiments, the calling party 102a is prompted for contact handling preference. Contact handling preferences allow the calling party 102a to indicate what content is forwarded to the called party 112a and whether links to such content is forwarded to the called party 112a. This content may be stored at any appropriate location in messaging system until retrieved by the called party 112a and/or altered by the calling party 102a.

In step 322, the local messaging platform delivers the enhanced message to the called party 112a using the preferred contact information determined in step 320. The method ends at step 324.

Such an enhanced messaging system may augment an existing messaging system, such as a unified messaging system. It may be integrated with VoIP networks allowing a caller to create advanced multimedia messages. The caller may then incorporate their own stored content into such messages. Callers can add links to messages. This allows a caller to update and/or delete the stored content prior to access by the call recipient. The embodiments described above are incorporated seamlessly into existing networks because the terminating network need only understand the "do not forward call" directive and the ENUM functionality in IMS architecture can be leveraged to provide the enhanced messaging.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for call forwarding, comprising:
    receiving from a caller a call that has not been answered by an intended recipient, wherein the call is associated with routing information;
    creating an enhanced message comprising a message recorded by the caller and a link to previously stored additional content;
    determining alternate contact information associated with the intended recipient based on the routing information; and
    transmitting the enhanced message to the intended recipient based on the alternate contact information.

2. The method of claim 1, wherein determining the alternate contact information associated with the intended recipient based on the routing information comprises:
    mapping a telephone number of the intended recipient to the alternate contact information.

3. The method of claim 1, wherein determining the alternate contact information associated with the intended recipient based on the routing information comprises:
    determining an email address associated with the intended recipient based on the routing information.

4. The method of claim 1, wherein the previously stored additional content is modified prior to the intended recipient accessing the previously stored additional content.

5. The method of claim 1, wherein the previously stored additional content is deleted prior to the intended recipient accessing the previously stored additional content.

6. The method of claim 1, wherein creating the enhanced message comprises:
    receiving preferences from the caller identifying the previously stored additional content.

7. The method of claim 1, wherein the call comprises an indication that the call is not to be forwarded to a voicemail system associated with the intended recipient.

8. The method of claim 7, wherein the indication that the call is not to be forwarded to the voicemail system associated with the intended recipient comprises:
    an indication that a msg-taker service is not an acceptable contact.

9. The method of claim 1, further comprising:
    enabling enhanced messaging for the caller.

10. A non-transitory computer readable medium storing computer program instructions which, when executed on a processor, cause the processor to perform operations comprising:
    receiving from a caller a call that has not been answered by an intended recipient, wherein the call is associated with routing information;
    creating an enhanced message comprising a message recorded by the caller and a link to previously stored additional content;
    determining alternate contact information associated with the intended recipient based on the routing information; and
    transmitting the enhanced message to the intended recipient based on the alternate contact information.

11. The non-transitory computer readable medium of claim 10, wherein determining the alternate contact information associated with the intended recipient based on the routing information comprises:
    mapping a telephone number of the intended recipient to the alternate contact information.

12. The non-transitory computer readable medium of claim 10, wherein determining the alternate contact information associated with the intended recipient based on the routing information comprises:
    determining an email address associated with the intended recipient based on the routing information.

13. The non-transitory computer readable medium of claim 10, wherein the previously stored additional content is modified prior to the intended recipient accessing the previously stored additional content.

14. The non-transitory computer readable medium of claim 10, wherein the previously stored additional content is deleted prior to the intended recipient accessing the previously stored additional content.

15. A unified messaging system comprising:

a processor; and a memory to store computer program instructions, the computer program instructions when executed on the processor cause the processor to perform operations comprising:

receiving from a caller a call that has not been answered by an intended recipient, wherein the call is associated with routing information;

creating an enhanced message comprising a message recorded by the caller and a link to previously stored additional content;

determining alternate contact information associated with the intended recipient based on the routing information; and transmitting the enhanced message to the intended recipient based on the alternate contact information.

16. The unified messaging system of claim 15, wherein determining the alternate contact information associated with the intended recipient based on the routing information comprises:

mapping a telephone number of the intended recipient to the alternate contact information.

17. The unified messaging system of claim 15, wherein creating the enhanced message comprises:

receiving preferences from the caller identifying the previously stored additional content.

18. The unified messaging system of claim 15, wherein the call comprises an indication that the call is not to be forwarded to a voicemail system associated with the intended recipient.

19. The unified messaging system of claim 18, wherein the indication that the call is not to be forwarded to the voicemail system associated with the intended recipient comprises:

an indication that a msg-taker service is not an acceptable contact.

20. The unified messaging system of claim 15, the operations further comprising:

enabling enhanced messaging for the caller.

* * * * *